No. 695,581. Patented Mar. 18, 1902.
B. C. ROBERTS.
CORNSTALK CUTTER.
(Application filed June 27, 1901.)
(No Model.)
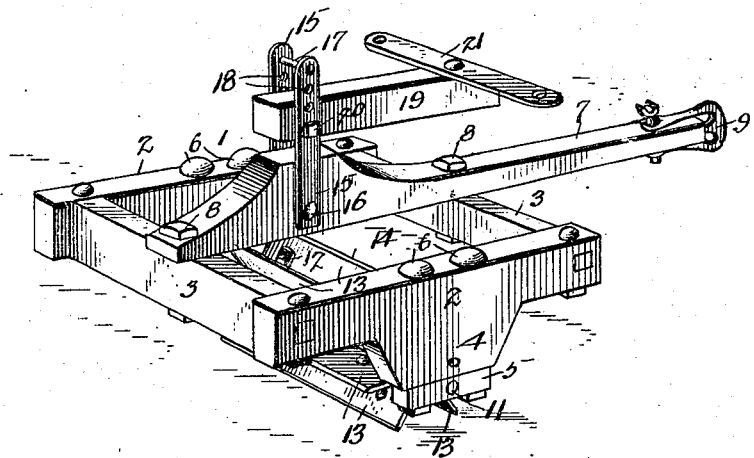
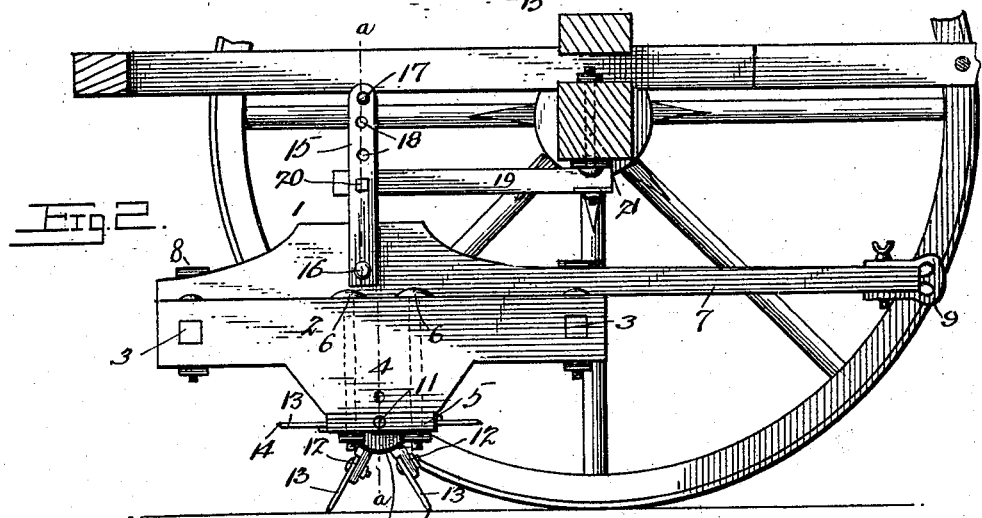
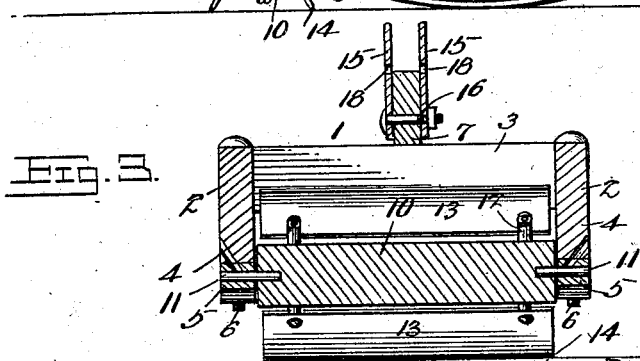
Witnesses
F. E. Alden
J. W. Garner
B. C. Roberts, Inventor
by C. A. Snow & Co.
Attorneys

UNITED STATES PATENT OFFICE.

BENJAMIN C. ROBERTS, OF WINDSOR STATION, VIRGINIA.

CORNSTALK-CUTTER.

SPECIFICATION forming part of Letters Patent No. 695,581, dated March 18, 1902.

Application filed June 27, 1901. Serial No. 66,313. (No model.)

*To all whom it may concern:*

Be it known that I, BENJAMIN C. ROBERTS, a citizen of the United States, residing at Windsor Station, in the county of Isle of Wight and State of Virginia, have invented a new and useful Cornstalk-Cutter, of which the following is a specification.

My invention is an improved cornstalk-cutter for cutting cornstalks in a field into short lengths, so that the same may be readily covered when the land is plowed; and it consists in the peculiar construction and combination of devices hereinafter fully set forth and claimed.

In the accompanying drawings, Figure 1 is a perspective view of a cornstalk-cutter constructed in accordance with my invention. Fig. 2 is a side elevation of the same, showing the cutter attached to the front truck of a farm-wagon. Fig. 3 is a vertical transverse section taken on a plane indicated by the line *a a* in Fig. 2.

The frame 1 of my improved cornstalk-cutter comprises a pair of side bars 2 and a pair of cross-bars 3, which connect said side bars together at their front and rear ends. On the under sides of the side bars 2 at the centers thereof are bolster-blocks 4, which may be formed integrally therewith or separately therefrom and secured thereto. On the under sides of said bolster-blocks are bearing-blocks 5. As here shown, vertical bolts 6 extend through said side bars, bolster-blocks, and bearing-blocks and secure the same together. A draft-beam 7 of suitable length has its rear portion disposed on the centers of the cross-bars 3 and secured thereto by bolts 8. At the front end of said draft-beam is a clevis 9, by means of which a singletree or doubletree may be readily connected thereto.

A cylindrical drum 10 has its spindles or shaft 11 journaled in the bearing-blocks 5. Radial arms 12 project from said drum, and to the outer portions of said radial arms are secured blades 13, having the outer edges 14 thereof sharpened, as shown. The said drum when the machine is in operation rotates, the blades 13 coming successively into engagement with the ground and in passing over the stalks serving to cut the stalks into short lengths, as will be understood.

My improved stalk-cutter may be either used as hereinbefore described or it may be used in connection with the front truck of a farm-wagon or with a sulky-plow.

I provide a pair of links 15, which have their lower ends pivotally connected to the draft-beam on opposite sides thereof at a point above the center of the frame 1 by a bolt 16. The upper ends of the said links are connected together by a bolt 17, and in the upper portions of the said links are a series of adjusting bolt-openings 18. The said links extend upwardly from the draft-beam, and between the said links is secured the rear end of a draft link or bar 19 by a bolt 20, the latter being disposed in appropriate bolt-openings 18. Thereby the said draft-link is pivotally and adjustably connected to said links 15. At the front end of said draft-link is a cross-bar 21, which is adapted to be disposed under the axle of the front truck of a wagon and bolted thereto, as shown in Fig. 2. When thus disposed, the draft may be applied directly to the stalk-cutter through the draft-beam 7 or indirectly thereto through the wagon-truck, the draft-link 19, and the links 15. When the stalk-cutter is used in connection with a sulky-plow, the links 15 and 19 are removed.

Having thus described my invention, I claim—

1. A stalk-cutter of the class described, having a draft-beam, upwardly-extending links pivotally connected to said draft-beam, and a draft-link flexibly connected to said link and extending forwardly therefrom, said draft-link being adapted to be attached to a wagon-truck, substantially as described.

2. A stalk-cutter of the class described having a draft-beam, upwardly-extending links pivotally and detachably connected to said draft-beam, and a draft-link flexibly connected to said links and extending forwardly therefrom, for the purpose set forth, substantially as described.

3. A stalk-cutter of the class described having a draft-beam, upwardly-extending links pivotally connected to said draft-beam, and a draft-link flexibly connected to said links and extending forwardly therefrom, said draft-link having a cross-bar at its front end, for the purpose set forth, substantially as described.

4. A stalk-cutter of the class described, having a draft-beam, upwardly-extending links pivotally connected to said draft-beam, and a draft-link flexibly and adjustably connected to said links and extending forwardly therefrom, for the purpose set forth, substantially as described.

In testimony that I claim the foregoing as my own I have hereto affixed my signature in the presence of two witnesses.

BENJAMIN C. ROBERTS.

Witnesses:
   N. F. YOUNG,
   ALBERT J. JOHNSON.